United States Patent
Blythe et al.

(10) Patent No.: US 7,207,043 B2
(45) Date of Patent: Apr. 17, 2007

(54) PROGRAMMATIC RESPONSE-TIME BASED WORKLOAD DISTRIBUTION TECHNIQUES

(75) Inventors: Christopher James Blythe, Morrisville, NC (US); Gennaro A. Cuomo, Apex, NC (US); Erik A. Daughtrey, Durham, NC (US); Matt R. Hogstrom, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 10/334,262

(22) Filed: Dec. 31, 2002

(65) Prior Publication Data

US 2004/0139433 A1 Jul. 15, 2004

(51) Int. Cl.
*G06F 9/46* (2006.01)
*G06F 15/16* (2006.01)
*G06F 15/173* (2006.01)
*G06F 17/00* (2006.01)

(52) U.S. Cl. ............... 718/104; 718/100; 718/102; 718/105; 709/201; 709/223; 709/225; 705/400; 705/412

(58) Field of Classification Search ........ 718/100–108; 709/200–226; 707/3, 8; 705/400–412
See application file for complete search history.

(56) References Cited

U.S. PATENT DOCUMENTS

| | | | |
|---|---|---|---|
| 5,664,106 A * | 9/1997 | Caccavale | 709/224 |
| 5,675,739 A * | 10/1997 | Eilert et al. | 709/226 |
| 5,745,778 A | 4/1998 | Alfiere | |
| 5,859,969 A * | 1/1999 | Oki et al. | 709/200 |
| 6,105,053 A | 8/2000 | Kimmel et al. | |
| 6,182,109 B1 | 1/2001 | Sharma et al. | |
| 6,397,252 B1 * | 5/2002 | Sadiq | 709/226 |

(Continued)

FOREIGN PATENT DOCUMENTS

EP 0725 339 A2 8/1996

OTHER PUBLICATIONS

Jen-Yao Chung, et al. "Goal-oriented dynamic buffer pool management for data base systems", *IEEE*, Aug. 1995 191-198.

(Continued)

*Primary Examiner*—Meng-Al T. An
*Assistant Examiner*—Jennifer N. To
(74) *Attorney, Agent, or Firm*—A. Bruce Clay; Marcia L. Doubet

(57) ABSTRACT

Workload is programmatically distributed across a set of execution resources. In a multithreaded server environment, response time to end users is improved while increasing the efficiency of software execution and resource usage. Execution time and wait/queued time are tracked, for various types of requests being serviced by a server. Multiple logical pools of threads are used to service these requests, and inbound requests are directed to a selected one of these pools such that requests of similar execution-time requirements are serviced by the threads in that pool. The number and size of thread pools may be adjusted programmatically, and the distribution calculation (i.e., determining which inbound requests should be assigned to which pools) is a programmatic determination. In preferred embodiments, only one of these variables is adjusted at a time, and the results are monitored to determine whether the effect was positive or negative. The disclosed techniques also apply to tracking and classifying requests by method name (and, optionally, parameters).

33 Claims, 8 Drawing Sheets

U.S. PATENT DOCUMENTS

| | | | |
|---|---|---|---|
| 6,427,161 B1 | 7/2002 | LiVecchi | |
| 6,477,561 B1* | 11/2002 | Robsman | 718/105 |
| 6,535,878 B1* | 3/2003 | Guedalia et al. | 707/8 |
| 6,542,920 B1* | 4/2003 | Belkin et al. | 718/104 |
| 6,629,142 B1 | 9/2003 | Badami et al. | |
| 6,816,882 B1* | 11/2004 | Conner et al. | 709/203 |
| 6,879,995 B1* | 4/2005 | Chinta et al. | 709/204 |
| 6,898,617 B2 | 5/2005 | Doolittle et al. | |
| 7,051,330 B1* | 5/2006 | Kaler et al. | 718/106 |
| 7,080,378 B1 | 7/2006 | Noland et al. | |
| 7,127,716 B2* | 10/2006 | Jin et al. | 718/105 |
| 2001/0025275 A1* | 9/2001 | Tanaka et al. | 705/412 |
| 2002/0065816 A1* | 5/2002 | Tsusaka et al. | 707/3 |
| 2002/0147693 A1* | 10/2002 | Banerjee et al. | 705/400 |
| 2002/0194251 A1* | 12/2002 | Richter et al. | 709/105 |

OTHER PUBLICATIONS

Pyarali, Irfan et al., Evaluating and Optimizing Thread Pool Strategies for Real-Time CORBA, 2002.

Ling, Yibei et al., Analysis of Optimal Thread Pool Size, Feb. 14, 2000, Publisher: ACM Press.

Welsh, Matt et al., SEDA: An Architecture for Well-Conditioned Scalable Internet Services, 2001, Publisher: ACM.

Calcote, John, Thread Pools and Server Performance, Dr. Dobb's Journal, Jul. 1997.

* cited by examiner

Multiple Logical Thread Pools Tuning States

PROGRAMMATIC RESPONSE-TIME BASED WORKLOAD DISTRIBUTION TECHNIQUES

BACKGROUND OF THE INVENTION

1. Related Invention

The present invention is related to commonly-assigned U.S. patent application Ser. No. 10/334,768 filed concurrently herewith, which is entitled "Dynamic Thread Pool Tuning Techniques", and which is hereby incorporated herein by reference.

2. Field of the Invention

The present invention relates to computer software, and deals more particularly with methods, systems, computer program products, and methods of doing business by programmatically distributing workload across a set of execution resources (and in particular, across execution threads in a multithreaded server environment).

3. Description of the Related Art

The popularity of client/server computing has increased tremendously in recent years, due in large part to growing business and consumer use of the public Internet and the subset thereof known as the "World Wide Web" (or simply "Web"). Other types of client/server computing environments, such as corporate intranets and extranets, are also increasingly popular. As solutions providers focus on delivering improved Web-based computing, many of the solutions which are developed are adaptable to other client/server computing environments. Thus, references herein to the Internet and Web are for purposes of illustration and not of limitation. (Furthermore, the terms "Internet", "Web", and "World Wide Web" are used interchangeably herein.)

Millions of people use the Internet on a daily basis, whether for their personal enjoyment or for business purposes or both. As consumers of electronic information and business services, people now have easy access to sources on a global level. When a human user is interacting with a software application over the Internet and is requesting content, delays or inefficiencies in returning responses may have a very negative impact on user satisfaction, even causing the users to switch to alternative sources. Delivering requested content quickly and efficiently is therefore critical to user satisfaction, and accordingly, it is important to ensure that the systems on the server side of the network perform as efficiently as possible.

Experience has shown that in an application server handling requests for various clients in this type of environment, it is usually necessary to constrain the usage of resources in order to provide the best throughput and response time across the variety of requests that are received. One of the primary resources of interest is execution threads (referred to equivalently hereinafter simply as "threads"). Unconstrained creation, usage, and destruction of threads can hurt both response time and throughput for various reasons which are known in the art. For example, if too many threads are created, the system overhead for managing the threads may be unacceptably high, and too much memory may be required for storing system state and other information for these threads. In addition, contention for shared resources is a primary reason for constraining the number of available threads, since queuing large numbers of threads for limited resources typically causes thrashing on those resources. On the other hand, however, if too few threads are available, incoming requests may wait a long time before being assigned to a thread, thereby increasing the response time to the end user.

Therefore, it is useful to tune the number of threads in the system. The set of threads that have been created but not destroyed will be referred to herein as a "thread pool". The number of threads to be created for the thread pool in a particular client/server environment is often specified by a user (e.g., a systems administrator) as a configuration parameter when initializing the server. Typically, tuning the thread pool size for a given set of applications is an iterative operation in environments where the applications are moderately to heavily driven, such that the thread pool is resized in an attempt to improve throughput and response times.

In a homogeneous workload, the requests will often have very similar overall system response times, and iteratively resizing the thread pool works well for improving performance of the system. Similarly, where the workload contains a mix of request types but those varied requests have similar response times, this type of resizing operation also works fairly well. However, for workloads with a highly varied response time mix, the problem is more complex.

When a single thread pool, having a constrained number of threads, is used with a workload consisting of request types that have varied average response times, it is possible to find a "best size" for the thread pool, where (on average) the requests are processed in a reasonable amount of time. However, this use of a single thread pool for a mixed workload tends to be sub-optimal. In particular, this approach disproportionately elongates the response times of requests having shorter execution times.

The reason for this phenomenon is that while constraining an application server's single thread pool is crucial to controlling resource utilization within that application server, as discussed above, the single thread pool also tends to become saturated with requests having longer execution times and thus those requests that have shorter execution times will effectively be starved. Bursts of requests with longer execution times can essentially block requests with shorter execution times from being assigned to a thread from the single constrained thread pool. And even though a particular request may have been processed very quickly by its thread once the thread was assigned from the thread pool, the request may have had to wait a very long time before the thread was assigned. The end user's (or in the more general case, the requester's) perceived response time for such requests may therefore be inordinately long.

What is needed are techniques that overcome these problems of the prior art.

SUMMARY OF THE INVENTION

An object of the present invention is to improve performance in client/server networks.

Another object of the present invention is to improve performance of multithreaded servers.

A further object of the present invention is to provide improved techniques for scheduling requests to threads from thread pools.

Still another object of the present invention is to define techniques for dynamically balancing workload in a multithreaded server environment.

Yet another object of the present invention is to define techniques for dynamically tuning thread pools to improve server performance for workloads having varied average response times.

A further object of the present invention is to define techniques that enable requests needing shorter amounts of execution time to spend less time waiting to execute.

Still another object of the present invention is to define techniques for programmatically distributing workload across a set of execution resources to shorten response times for short execution-time requests.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for programmatically distributing workload across a set of execution resources. In a preferred embodiment, this technique comprises: determining a number of available thread pools; obtaining execution times from historical statistics of a workload on the server; and programmatically distributing the obtained execution times over the number of available thread pools. When inbound requests are received at the server, at run-time, they may then be assigned to the available thread pools according to the programmatically-distributed execution times. The thread pools are preferably logical thread pools.

The programmatic distribution preferably further comprises sorting the execution times and allocating the sorted execution times (e.g., evenly) over the number of available thread pools. A count of the sorted execution times may be determined, and in this case, the allocation preferably further comprises dividing the count of sorted execution times by the number of available thread pools to find a value, "N", and assigning upper bounds on execution times for each of the available thread pools, according to the sorted execution times when accessed using integer multiples of "N" as an index.

When an inbound request is received at the server, preferred embodiments determine a classification key of the received request, locate an average execution time for the received request using the determined classification key, and locate a particular available thread pool where the received request will be executed (preferably, by iteratively comparing the located average execution time to each of the assigned upper bounds until the compared-to assigned upper bound is greater than or equal to the located average execution time).

Preferred embodiments track execution time of the inbound requests as they execute at the server, and revise the execution times of the workload to reflect the tracked execution times. The programmatic distribution is preferably periodically recomputed to reflect the revised execution times.

The present invention may also be provided as methods of doing business. For example, a service may be offered to customers whereby operational characteristics of their client/server network traffic is monitored, and adjustments to execution resources are made programmatically based on observations. This service may be provided under various revenue models, such as pay-per-use billing, monthly or other periodic billing, and so forth.

The present invention will now be described with reference to the following drawings, in which like reference numbers denote the same element throughout.

DESCRIPTION OF PREFERRED EMBODIMENTS

Figure 1:
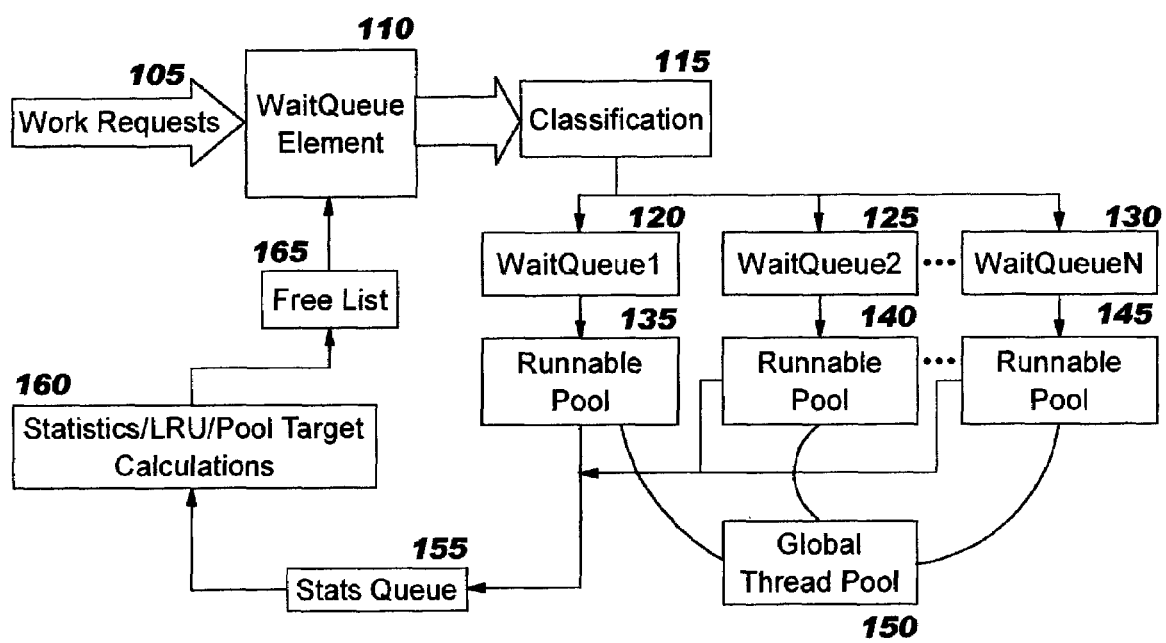
FIG. 1 depicts an abstract view of a system operating according to the present invention.

The present invention dynamically and programmatically distributes inbound requests across a set of execution resources in a multithreaded server of a client/server networking environment. In preferred embodiments, the execution resources are threads, and these threads are logically organized into a plurality of thread pools. (The set of available threads may be thought of as coming from a single physical pool, which is then subdivided into the logical plurality of pools. See also the discussion of elements 135, 140, 145, and 150 of FIG. 1, below. For ease of reference, the logically-organized pools are referred to herein simply as thread pools, and the single physical pool is referred to as a "global" thread pool.)

The programmatic request distribution process preferably comprises programmatically determining which inbound requests should be assigned to which pools (and the requests will enter a wait queue for that pool, if necessary), and in optional enhancements, the number and/or size of thread pools in use may be programmatically tuned as well. In preferred embodiments of the programmatic distribution process, the present invention tracks requests as they execute; determines the average execution time and wait time per type of request; and dynamically adjusts the allocation of requests to particular pools (preferably by determining an upper bound on average execution time for the requests to be processed in each pool). In preferred embodiments that also dynamically adjust the number of thread pools and/or the number of threads in the pools, only one of these variables (upper bound on average execution time per pool, number of thread pools, and number of threads in pools) is adjusted at a time, and another snapshot is taken to determine whether the effect was positive or negative.

Problems associated with using a single constrained thread pool, according to prior art techniques, have been described above. One solution to these problems, which is known in the art, is to set up a small number of thread pools (where this number is statically predefined) and to manually configure the types of requests that can enter each of the pools. All other requests may then be handled by an "all other" pool. This approach requires profiling of the system to determine which types of requests would benefit from the mechanism, and manually constructing side-table information that describes the mapping of request types to pools.

There are benefits and drawbacks to this approach. One benefit is that if a set of requests can be identified whose queue times are abnormally elongated and whose execution times are sufficiently short relative to all other request types, then the identified set will probably achieve better response times when identified to a run-time that can utilize this information appropriately and vector (i.e., direct) these requests to a specific thread pool.

However, the drawbacks outnumber the benefits for this approach. For one, this approach does not take the changing nature of request streams (such as those encountered in Web applications) into account. It is very likely that a hard-coded table containing the mapping of request types will either be wrong to begin with, or over time will need to be changed—either because the characteristics of the originally-measured code have changed or because new code has changed the dynamics of the system. In any case, as will be obvious, it is likely that the information will be outdated very quickly, even if it wasn't wrong to begin with.

A better solution, and one used by preferred embodiments of the present invention, is to track the average execution times and wait times for given types of requests and then assign requests of each type to thread pools according to their execution time.

By tracking the average execution times for the various request types handled by an application server, it is possible to group these request types into some number of similar-execution-time categories. In one approach, the categories may be determined by building a frequency distribution of execution time bands. A simple implementation, which is used in preferred embodiments, might calculate the bands by taking the (predetermined) number of available thread pools, and using the gathered execution times to divide the request types among this number of thread pools. This may also be referred to as computing statistical tiles, where the tile values (that is, the upper bound on each particular band) would become the maximum execution time allowed into each pool. The process of computing the tile values and then creating a table of mappings (or a similar association) that identifies which execution times correspond to each tile is referred to herein as a "distribution calculation" or "pool target calculation". The process of using this information to determine where a newly-arriving inbound request should be directed is referred to herein as "classifying" the request. The gathered data that is used in determining the upper bounds on execution time is referred to generally herein as "classification data", and includes the average execution time for each request type as well as other information that will be described below in more detail.

For example, if there are 10,000 execution times in the classification data and 10 thread pools are to be used, then request types having the 1,000 shortest execution times may be processed by threads from the first pool, and request types having the 1,000 longest execution times may be processed by the last (10th) pool. The present inventors have determined that this approach works well for a known pool size, since the distribution calculation automatically takes into account the historical frequency of requests that fall within each execution time band. Refer to FIG. 1 (discussed below) for details on how the classification, or run-time vectoring of requests to thread pools, may be performed according to preferred embodiments.

Through experimentation, it has been found that the availability of a plurality of logical thread pools helps overall response time and throughput. As discussed earlier, prior art approaches statically allocate requests to a plurality of pools. The disadvantages of static assignments have been described, and the dynamic classification and distribution calculation techniques of the present invention avoid these disadvantages. The techniques disclosed herein also enable dynamically tuning pool sizes and/or the number of pools to a given workload. (A detailed discussion of how this tuning may be carried out is provided below, with reference to FIGS. 5–8.)

When techniques for dynamically adjusting the number of thread pools are not in use, the number of pools to use during operation of preferred embodiments is preferably allocated to a predetermined number (which may be a configurable value). When the number of pools is to be determined dynamically by examining the behavior of the system, an iterative approach is preferably used, as will be described herein. In the latter case, the number of pools (and also the pool sizes) to be used initially may be determined by prior knowledge (e.g., saved state information about the most-recently used values, which may have been determined dynamically) or by starting with an initial default configuration.

When dynamically tuning the number of pools and size of pools, in addition to dynamically re-calculating the distribution of request types to pools, this type of run-time tuning can be approached as a three-dimensional problem. One dimension is to calculate the tiles for the associated execution times of the request types, another is to tune the number of pools, and another is to tune the sizes of the pools. This process is made more complex because of interactions between these tuning aspects. (It should be noted that calculating the tile values for programmatically distributing requests is itself a type of tuning, and thus use of the term "tuning" herein is not intended to refer exclusively to the pool number and pool size tuning processes, except where the context of the reference indicates otherwise.) For example, changing the size of a pool or changing the number of pools will many times affect the execution times of the requests directed to the pools. This, in turn, may force various request types into different bands. To illustrate this, suppose there is a configuration having 4 bands, and that the third band (where the next-longest-executing requests are serviced) has some number of threads "T". Further suppose that using this number of threads, the requests in band 3 complete their execution in a time interval ranging from some lower bound "LB(3)" to some upper bound "UB(3)". If the number of threads, T, for band 3 is changed, then the execution times for some of the request types directed to band 3 may fall outside the range [LB(3) . . . UB(3)]. This means that, according to the approach used herein, those request types no longer belong in band 3. However, moving them into another band may have knock-on effects, whereby the execution times of requests in that band are then changed (indicating that additional request types may need to move to other bands). To control this effect, preferred embodiments bind execution times (and therefore request types that tend to execute in that amount of time) to a particular execution band during the pool size tuning process and only re-bind them when a subsequent distribution calculation (i.e., a subsequent analysis of execution data and revision of the mappings deduced therefrom) occurs. Note that distribution calculation(s) will typically occur concurrently with the pool size tuning (and also concurrently with the pool count tuning, during which the execution times are preferably not bound). In preferred embodiments, the binding is carried out by using a flag in the classification data of the request types, and the binding flag is cleared after the pool size tuning is complete.

A number of dynamic elements are observable in the multithreaded server environment, as follows:

DE1: A given request type's execution time can change depending on the resources it utilizes and the code paths taken.

DE2: New requests enter the system and must be classified according to their execution time.

DE3: Pool sizes can be changed, and will affect the execution time of the requests vectored to the pool.

DE4: The distribution of execution times can be re-calculated and various request types may change bands as a result.

DE5: The number of bands and number of corresponding pools can be changed.

Referring to the dynamic elements listed above, notice that DE1 and DE2 are independent of the tuning process. Indeed, they are the primary reasons for requiring a dynamic tuning capability. Otherwise, the distribution of request types to bands could be calculated once and left alone. (Similarly, it is likely that little or no benefit would be gained by dynamically adjusting pool sizes or the number of pools in the absence of DE1 and DE2.) Also, note that dynamic elements DE3, DE4, and DE5 are directly attributable to the tuning process. These observations are used by the tuning techniques disclosed herein to successfully drive the tuning process.

The dynamic distribution and tuning techniques disclosed herein are therefore designed to achieve a balance across the set of dynamic elements. To incur as little overhead as possible, pathlength, contention, and frequency of tuning are preferably minimized. To avoid interactions and knock-on effects when tuning, preferred embodiments make one change, allow the system to execute in this state for some interval of time, and measure the effects of the change. (Although this approach is beneficial for isolating the positive or negative impacts of a change, it may elongate the overall duration of the tuning process. Therefore, it is beneficial to set the maximum number of bands to a relatively small number at the outset, unless absolutely necessary. The larger the system, the larger this maximum number will preferably be.)

There are three primary goals of the tuning approach of the present invention, as follows:

G1: Attempt to reach a quasi-steady state for steady workload mixes as quickly as possible.

G2: Avoid wild fluctuations in execution times which may be caused by over-control.

G3: Achieve a balance between available thread resources and execution time for incoming requests.

To achieve these goals, it is necessary to keep historical statistics of the execution and wait or queue times for the requests processed by the system. The present invention therefore tracks this information, as stated earlier. The decisions made during tuning can then be evaluated based on a comparison of the current values seen for these elements versus the past values seen. (Qualifying the value of the change made will preferably also take into account the dynamic nature of the system with respect to new types of requests and changes in the rate of current requests—including a rate of 0. Newly-encountered request types are automatically handled by embodiments of the classification process of the present invention, as described below with reference to FIGS. 2–3. Changes in arrival rates for particular request types are automatically accommodated by the distribution calculation, which may modify the upper bounds of execution time-to-pool mappings. Changes in arrival rates may also result in programmatically tuning the thread pool sizes that service those request types.)

One difficulty that presents itself immediately when considering dynamic workload distribution and pool tuning is the fact that most real application servers are not closed systems. That is, the execution times and queue times exhibited by requests are often affected by downstream and upstream forces, depending on the type of work performed. For instance, a particular request type may make remote calls (such as database invocations) and its execution time may fluctuate depending on the availability of, or contention for, these called resources.

Rather than attempting to build a complex feedback system to handle this effect, embodiments of the present invention preferably apply a filtering mechanism, where this filtering mechanism comprises taking two or more snapshots of execution time and wait time in the absence of changes to the per-pool execution time upper bounds, number of pools, and number of threads per pool. The data gathered from these snapshots is compared in an attempt to detect requests that fluctuate independently of tuning—i.e., those requests which fluctuate normally. If a request does not fluctuate, it may be "filtered out" in this process. (That is, if the request stays within its standard deviation, then it may not be useful to attempt tuning the system for better performance as to this request.) Preferably, the filtering mechanism applies a statistical approach and uses standard deviation, per request type, as a basis for determining whether a request type has fluctuations. Any request types having an execution time pattern whose standard deviation is relatively large in the absence of tuning changes may then be treated as a normally-fluctuating request type. For example, execution time data for one or more request types may be analyzed following a sampling interval in which no tuning changes were made. The standard deviation for each of these requests types can be computed, for this "no-change" interval. Data gathered during another interval, where a tuning change was active during that interval, may be analyzed in a similar way to determine the standard deviations for the request types in the presence of the tuning change. By comparing the standard deviation for a particular request type during the no-change interval to its standard deviation during the tuning-change interval, projections can be made as to the impact of the tuning change on this request type's execution time. (It may be useful, during this process, to focus on the request types that have been determined not to fluctuate normally.)

Note that fluctuations can be caused by internal contention as well as external wait times (which may vary widely). Many times, constraining the thread pool size for requests exhibiting these problems can help overall throughput. Consequently, it is possible to not only use the standard deviation as an indication of whether a request type's execution time is fluctuating, but also as an indication as to the effectiveness of a pool size or number of pools change.

So, by taking all these factors into account, it is possible to build a self-tuning and high-throughput mechanism to distribute work effectively to multiple thread pools based on execution and wait/queue time tracking. The techniques disclosed herein enable achieving a balance across the entire workload dynamically, and also allow for the workload to change characteristics over time and still achieve optimized throughput and response time.

Referring now to FIG. 1, an abstract view of a system 100 operating as disclosed herein is illustrated. As work requests 105 (e.g., inbound client requests) enter the system, a wait queue element ("WQE") 110 is created for each such request, according to preferred embodiments. The WQE may be considered as "flowing through" the system, as the request is processed, and is used for gathering information pertaining to the request and its current processing. In object-oriented programming terms, the WQE is preferably implemented as a "wrapper" for the inbound request. Each wrapper includes information to identify its associated request, such as the request's type. This identifying information may also be referred to as a "classification key", in that it can be used to locate previously-stored historical statistics that will be used in classifying inbound requests for purposes of vectoring them to a particular thread pool. In addition to this classification key, the WQE stores the request's current execution time and current queued time. Preferably, the WQE also holds a reference to the classification data for this request's type, such that the classification data may be retrieved using the classification key stored in the WQE. In preferred embodiments, this classification data comprises: execution time, preferably stored as a moving average; queued time, preferably stored as a moving average; and optionally the standard deviation values for the request type's historical execution time and queued time values. These standard deviation values are preferably moving values as well. Storing the classification data with the WQE enables more efficient operation of the statistics calculating thread (as described in more detail with reference to elements 155 and 160) as the request's current execution time and wait time are factored into to the historical statistics. By using moving averages and moving standard deviation values, i.e., values that are updated with each new execution, embodiments of the present invention dilute the effect of past anomalies in execution and/or queued time.

The inbound request (along with its WQE) is input to a classification operation 115. This classification comprises determining which thread pool this request should be assigned to. In preferred embodiments, the previously-computed classification data (i.e., the historical statistics) for this request type is used to determine the average execution time for requests having this type (or a similar type, if a wildcard or similar matching approach is supported). Using the average execution time, a pool can be identified that handles requests that are like, or behaviorally similar to, this request. Therefore, the prior art problem of long-executing requests blocking otherwise-quickly-executing requests is avoided.

In alternative embodiments, additional or different information may be used as an index to locate the applicable historical statistics during the classification operation 115, rather than using request types as classification keys. For example, request types may be further qualified by using input values of their parameters (and, optionally, the parameter names), and this combination of request type plus parameters may be used to index the classification data (which is also preferably recorded at this more-granular level). The Uniform Resource Identifier ("URI") portion of a Uniform Resource Locator ("URL") may be used, and parameter names/values may also be used with the URI. Also, while "request type" is a useful categorization of requests in a Web environment, it should be noted that in other environments, other information may be pertinent. For example, in an Enterprise JavaBeans® environment, method names (including their class or deployed name) may be used in place of request types. Parameter names/values may be used with method names, if desired, as further qualifiers. ("Enterprise JavaBeans" is a registered trademark of Sun Microsystems, Inc.) Thus, references are made herein to "request types" by way of illustration but not of limitation.

Figure 2:
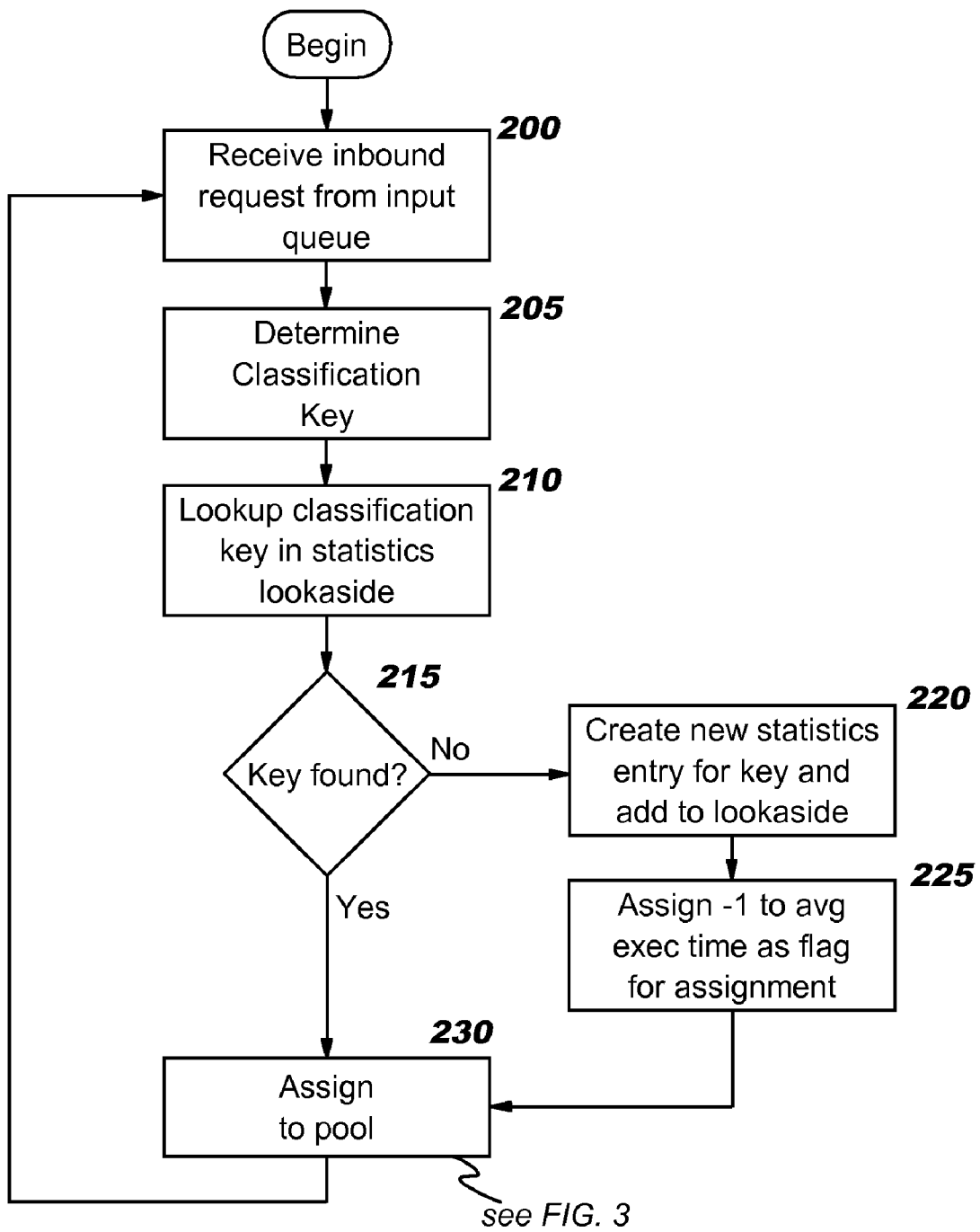
FIGS. 2–4 provide flowcharts illustrating how preferred embodiments of the present invention may determine which request types should be assigned to which thread pools.

Referring now to FIG. 2, the classification operation 115 will be described in more detail. At Block 200, a new inbound request is received from the input queue. Block 205 analyzes this request to determine its classification key (or more generally, its identifying information). The manner in which a particular implementation of the present invention locates the classification key in the inbound request will depend on whether request types, or request types plus parameter values, etc., are of interest for classifying requests in that particular environment. Once the classification key is determined, it is used (Block 210) as an index to the mapping table or other repository where historical statistics are recorded.

Block 215 checks to see if previously-recorded classification data (and in particular, average execution time) was located for this classification key. If not, then this inbound request is considered as a "newly-arriving" request type. (As will be obvious, it may happen that the request type has previously been processed by this system, but that the statistics data for the most-recent processing has already aged out. Preferably, a least-recently-used, or "LRU", approach is used to keep the amount of storage consumed for historical statistics data at an implementation-specific "reasonable" level.) Blocks 220 and 225 perform additional processing for newly-arriving request types. The processing of Block 220 comprises creating a new entry in the classification data to store statistics for this new request type, where this new entry is indexed by the current request's classification key. Block 225 then initializes this new entry, preferably by setting the average execution time therein to a special value, such as a negative 1 ("−1"). This special value is detected in the pool-assignment process, as further discussed with reference to FIG. 3. (Alternatively, the value might simply be set to zero.)

After locating the request's statistics data (i.e., when Block 215 has a positive result) or after creating and initializing a new statistics entry (when Block 215 has a negative result), control reaches Block 230, which invokes a pool assignment process that determines which pool the current inbound request should be assigned to and makes that assignment. This process is described in detail in FIG. 3. Having finished its processing of the current inbound request, the logic of FIG. 2 is iteratively performed for a subsequent request by returning control to Block 200.

Figure 3:
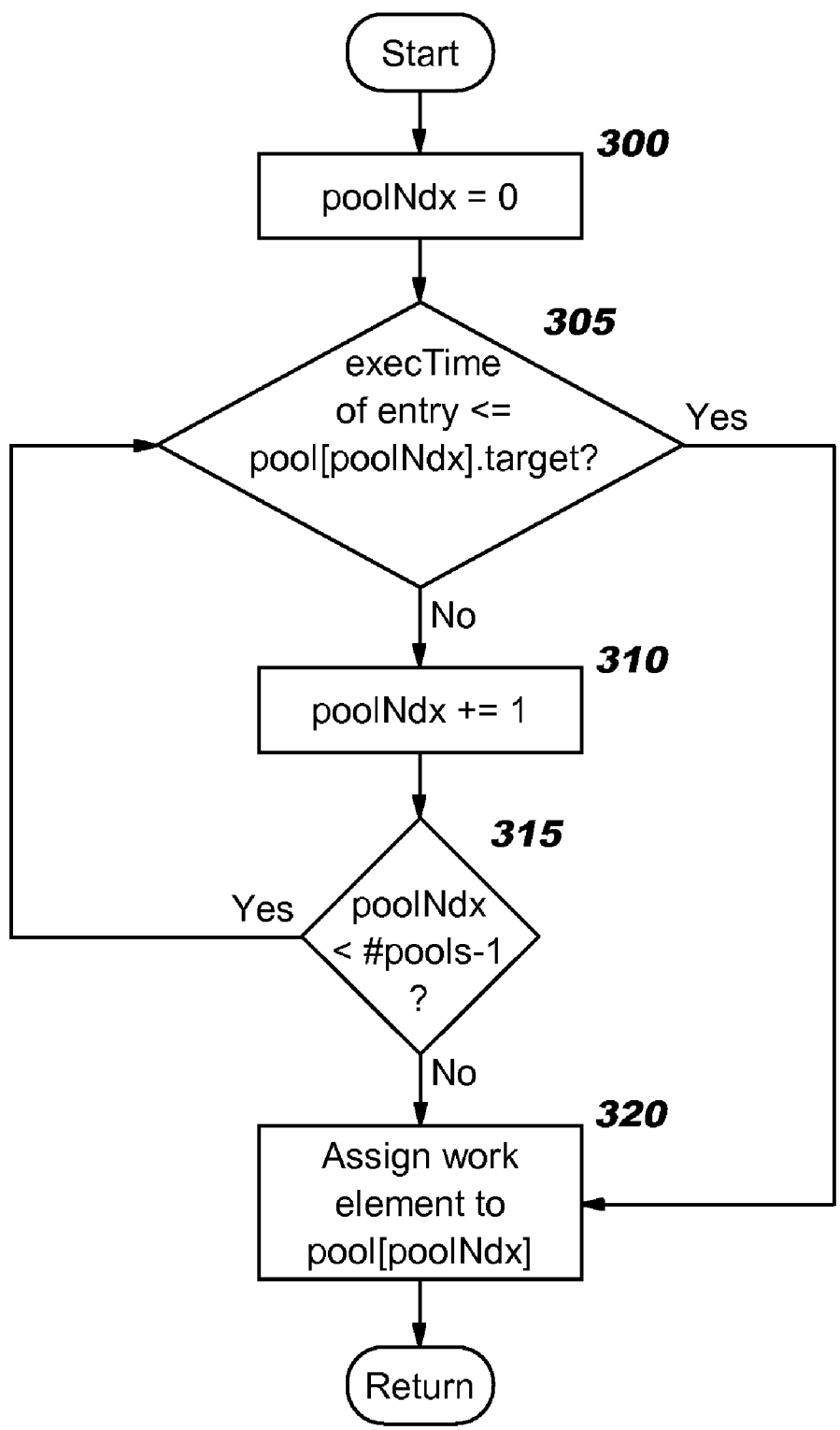

FIG. 3 provides further details about how preferred embodiments may implement the pool assignment process invoked from Block 230 of FIG. 2. This process begins (Block 300) by initializing a pool counter or index, referred to in the figure as "poolNdx". This poolNdx value is used to loop through the set of pools, checking for the one to which the current inbound request should be assigned. Pools accept progressively-higher execution time work, and work having the highest execution times is therefore assigned to the last pool.

Block 305 tests to see if the average execution time for this current inbound request is less than, or equal to, the target upper bound for the pool indexed by the value of poolNdx. The average execution time for the request is preferably obtained from historical statistics associated with this request's type, or it may have been initialized to a negative 1 (in Block 225 of FIG. 2) if historical statistics for this request type were not available. In the latter case, the test in Block 305 will be true upon the first iteration through the logic in FIG. 3, and thus preferred embodiments assign newly-arriving request types to the pool that processes requests having the shortest execution times. (Other approaches for selecting a pool to process newly-arriving request types may be used in alternative embodiments.)

If the test in Block 305 has a positive result, then the pool to process this request has been found. Control therefore transfers to Block 320, where the work element is vectored (i.e., assigned for execution) to the pool indexed by poolNdx. The processing of FIG. 3 is then complete, and control returns to the invoking logic in FIG. 2. Otherwise, when the test at Block 305 has a negative result, then the pool index is incremented at Block 310, and Block 315 checks to see if there are still more pools whose target upper bound can be checked. This checking process compares the current pool index value in poolNdx to a value one less than the total number of pools. (A variable "#pools" stores the number of pools currently in use.) This approach will result in always assigning request types whose execution time is higher than the last tile value to the last pool. If there are more pools that can be checked, control returns to Block 305, and if not, then processing continues at Block 320 where the current inbound request will be vectored to the current (in this case, the final) pool.

As an example of how FIG. 3 operates, suppose that an implementation is using 3 pools, and that the tile values (i.e., upper bounds on execution time) for these pools are set to 10 time units and 20 time units. Using the approach shown in FIG. 3, any request types that execute using 10 or fewer time units will be vectored to the first pool, along with newly-arriving request types, and request types that require more than 10 but not more than 20 time units will be vectored to the second pool. Request types requiring more than 20 time units will be vectored to the third pool. Suppose that the historical statistics for an inbound request's type indicate that it requires, on average, 50 time units of execution. When the poolNdx value is 0, 50 will be compared to 10 at Block 305, and since this test will have a negative result, Block 310 will increment poolNdx to 1. On the next iteration through Block 305, 50 will be compared to 20. This test will also have a negative result, and Block 310 will increment poolNdx to 2. The test in Block 315 will then compare 2 (the poolNdx value) to 2 (1 less than the number of pools); because the test will have a negative result, the request will be vectored to the third pool (i.e., the pool having index value 2, using zero-based indexing).

Figure 4:
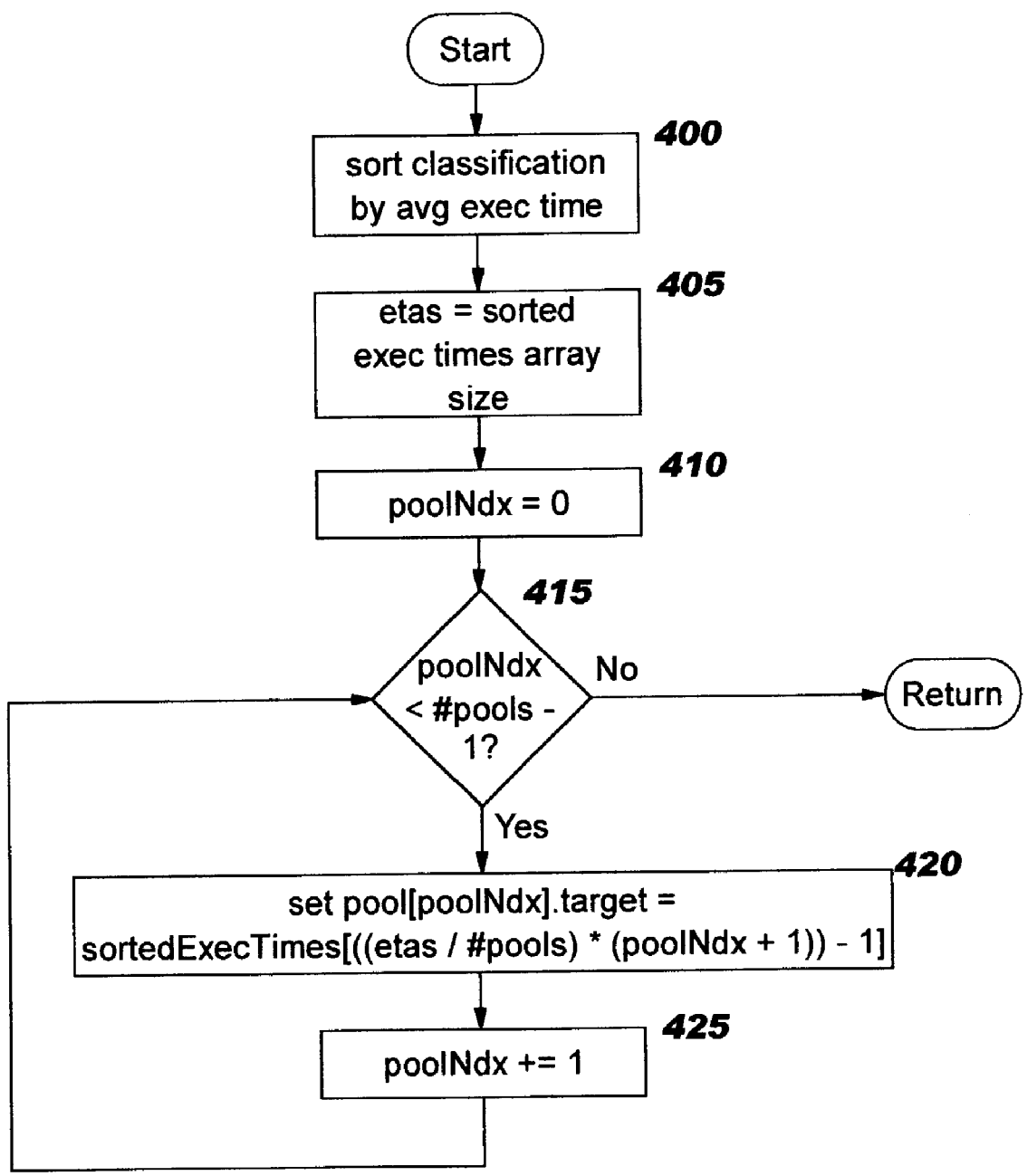

FIG. 4 provides logic illustrating how preferred embodiments determine the tile values, or upper bounds on per-pool execution time, by analyzing the execution and wait time characteristics of a heterogeneous, dynamically-changeable workload. This process is referred to herein as the distribution calculation or pool target calculation process. Preferably, the logic in FIG. 4 is invoked periodically to revise the upper bounds, as will be described below with reference to element 160 of FIG. 1.

Block 400 sorts the current collection of classifications (i.e., the collection of historical statistics) by their average execution time. As stated earlier, this average execution time value preferably represents a moving average over some recent interval. In this manner, a problem state or other anomaly that occurred in the past (such as a timeout situation that resulted in an overly-long execution time, or an exception condition that caused an abnormally-short execution time) does not skew future decisions. Preferred embodiments copy the execution times into an array, and sort this array. (Once storage for this array has been allocated, it is preferably retained for subsequent iterations of FIG. 4, unless a re-allocation is required in order to increase the array size.)

Block 405 sets a value "etas" (for "execution time array size") to the size of this sorted collection of execution times. This "etas" value then functions as a counter of how many execution times there are, such that the execution times can be properly distributed among the set of pools. Block 410 initializes pool index value poolNdx to zero.

In Block 415, a test is made to see if there are still more pools whose target upper bound needs to be assigned. This checking process compares the current pool index value in poolNdx to a value one less than the total number of pools (where this total number is stored in a variable "#pools".) This approach will result in assigning one less upper bound than there are pools, such that (as discussed with reference to FIG. 3) all request types whose execution time is higher than the last of the upper bounds will be vectored to the last pool. If the test in Block 415 has a positive result, then processing continues at Block 420, and if it has a negative result, then there are no more upper bounds to be assigned and control therefore returns to the invoking logic.

At Block 420, the upper bound on execution times to be vectored to the current pool (i.e., the pool as indexed by poolNdx) is computed and assigned. In preferred embodiments, this comprises equally distributing the total number of execution time statistics (and therefore their associated request types) over the available pools. Accordingly, the "Nth" element from the sorted execution times is located, and the execution time from that element is assigned as the upper bound (referred to in the figure as the "target" attribute) of the current pool. The Nth element is determined, as shown in Block 420, by first dividing the count of elements in the sorted array (represented by the value of "etas") by the number of available pools (in #pools); then multiplying this by the poolNdx value+1; and finally, subtracting 1 from that value.

After setting the upper bound, Block 425 then increments the pool index value, and control returns to Block 415 to determine if there are still more upper bounds to be assigned.

As an example of how the logic in FIG. 4 operates, suppose that there are 12 classifications in the current collection. (As will be obvious, in practice there may be hundreds or thousands of classifications.) Further suppose that there are 4 available pools. On the first iteration, the processing in Block 420 will compute the upper bound for pool(0). The value of "etas" is 12 in this example, and thus (etas/ #pools) is 12/4, or 3. Multiplying this value by 1 yields 3, and after subtracting 1, the upper bound for pool(0) is the execution time taken from sortedExecTimes[2]. On a subsequent iteration, the upper bound for pool(1) will be set to the execution time from sortedExecTimes[5], and so forth.

The approach shown in FIG. 4 results in setting the upper bounds to a value that is based on the distribution of the execution times that have been recently observed. Note that the number of pools to which upper bounds must be assigned may change dynamically, as the number of pools is tuned. (Refer to the discussion of FIGS. 5–7 for more information on how the number of pools may be tuned.) The logic depicted in FIG. 4 automatically adapts to changes in the number of pools.

Returning now to the discussion of overall processing as depicted in FIG. 1, as each inbound request is classified at 115, it is then directed to the appropriate thread pool (i.e., the thread pool identified using the processing of FIGS. 2 and 3). Often, a request must enter a wait queue, waiting for a thread to become available. Thus, the requests are shown in FIG. 1 as being directed to one of "N" wait queues 120, 125, 130, where each wait queue corresponds to one of the N logical thread pools 135, 140, 145 currently being used in system 100. (As will be obvious, if the number of pools in system 100 is increased or decreased at some later point, the number of wait queues should be adjusted accordingly. Also, the size of the wait queues varies with the number of queued elements, and the dynamic tuning disclosed herein is not for purposes of modifying the queue size.)

At some point, the queued request will be assigned to a thread from the thread pool for which it has been queued. The amount of time the request spent in the wait queue is recorded, according to preferred embodiments, in its WQE. (It may also happen that the request bypasses the wait queue, if a thread is available when the request completes the classification operation. In that case, the wait time is recorded as zero. However, such requests may in fact be submitted to the queue, and will simply spend a very short amount of time in the queued state. Subsequent discussions herein assume that the implementation sends all classified requests to a queue.)

FIG. 1 shows the inbound requests traversing from a wait queue to a "runnable pool" 135, 140, 145. These runnable pools correspond to the logical thread pools described herein, and as FIG. 1 illustrates, the threads in these logical pools are actually defined in the global thread pool 150. In preferred embodiments, the runnable pools contain some limited number of executable wrapper objects (when implementing the present invention in an object-oriented language), where each wrapper object represents one of the threads assigned to the logical thread pool. (The executable wrapper object also provides an interface mechanism for the thread.) Accordingly, as with the number of threads, the number of executable wrapper objects may vary from one pool 135, 140, 145 to another. (Within a particular runnable pool, the number of executable wrapper objects may vary due to performing the pool size tuning operations disclosed herein.) Thus, an inbound request and its WQE remain in a wait queue until one of the executable wrapper objects in the runnable pool associated with that wait queue is available. (Availability of the executable wrapper object implies, by definition, that a thread is available.) In this manner, the executable wrapper objects provide an efficient and reliable way to enforce the limit on the number of threads per pool, yet still use a single global thread pool where the threads are actually defined. (Using a single global thread pool results in significantly less overhead than maintaining separate physical thread pools. This is especially true during tuning operations where the number of threads per pool is being changed: rather than creating and destroying threads, as would be done if separate physical thread pools were used, preferred embodiments simply allocate more or less threads to a logical pool by altering the number of executable wrapper objects available in the logical pool.)

The size of each thread pool 135, 140, 145 preferably varies depending on how much work of the type being directed to that pool should run concurrently. When the optional pool size tuning is implemented (as described below with reference to FIGS. 5, 6, and 8), the sizes of the pools will be self-tuning. For example, if one pool is servicing requests that need database access, and if the number of connections to the database system must be restricted in order for the requests to execute optimally, then the size of that pool will tend to tune itself such that it does not exceed the size that will degrade performance of its requests.

Each request spends some amount of time executing, and upon completion of its execution, the request's thread is returned to its runnable pool (i.e., by returning or freeing up the executable wrapper object) and the request's WQE is updated to record its execution time. The content requested by the client is returned, using prior art techniques (not shown in FIG. 1). The WQE is queued for statistics processing (see statistics queue 155), after which a statistics calculating thread will eventually dequeue the WQE and process its data, indicated by element 160.

For purposes of the present invention, the processing performed at 160 comprises processing the wait time and execution time from the queued WQE, performing a least-recently-used ("LRU") trimming process, and/or performing pool target calculations. A statistics calculating thread is preferably implemented to run as a background process, and is preferably invoked in a timer-driven manner. In preferred embodiments, the time interval is configurable, and has a minimum value (such as 20 seconds) so as not to degrade system performance.

According to preferred embodiments, if there are entries on the statistics queue when the statistics calculating thread is executing, then those entries are dequeued and processed. Other operations may also be carried out, depending on the timeouts that have occurred. Preferably, only one timeout is handled per invocation of the statistics calculating thread, and preference is given to processing statistics from queue 155. (The incoming statistics on this queue update the classifications, and should therefore be processed quickly in order that the classifications will represent actual conditions in a timely manner. The LRU and pool target calculations depend on aggregate information, and therefore do not need to run as often.)

When processing the statistics queue, the statistics calculating thread dequeues an entry and revises the historical statistics to include the current execution and wait time information. As stated earlier, a reference to historical statistics is preferably held in the queued WQE, such that the values are readily available in an efficient manner. In this case, the statistics calculating thread first obtains the identifying information (e.g., the request type, and in alternative embodiments, additional or different information such as parameter values) from the dequeued entry, and uses the identifying information as a classification key to access the previously-computed historical statistics. The wait time and execution data maintained in the historical statistics are then revised to reflect the information from the dequeued entry, and the standard deviation information may also be revised if this information is used in a particular implementation. Preferably, the statistics calculating thread is event-driven, and is awakened when incoming statistics are received. The wake-up event is preferably also triggered upon a timeout. (The LRU and pool target calculations are preferably performed unconditionally, upon expiration of their associated timers.)

Different timer intervals may be used for triggering the processing of the LRU trimming process and the pool target calculations. If the LRU trimming process is triggered, then classification data which has not been recently used is preferably discarded, and the storage resources used for that data are preferably freed. (For example, the end user may have moved to a different Web page, making certain previously-received request types irrelevant to the server's current workload. In this case, it is no longer useful to consider statistics for those request types. In addition, the statistics represent aggregate information for a collection of end users, and some of these users may have ended their sessions. In this case, some of the collected data may no longer be pertinent to the system's current operational conditions.) If the pool target calculations are triggered, then the processing of FIG. 4 (described above) is invoked. Using a single thread for multiple purposes at 160, rather than separate threads for the different types of processing that have been described, minimizes overhead and also reduces contention for the shared resources such as the classification data.

After the information is extracted from the dequeued WQE and processed at 160, the WQE can be returned to a free list 165 for subsequent use. (Or, the storage used for the WQE can be freed. Preferred embodiments reuse WQEs in an attempt to reduce overhead.) The processing of FIG. 1 repeats in this manner for each inbound request.

Figure 5:
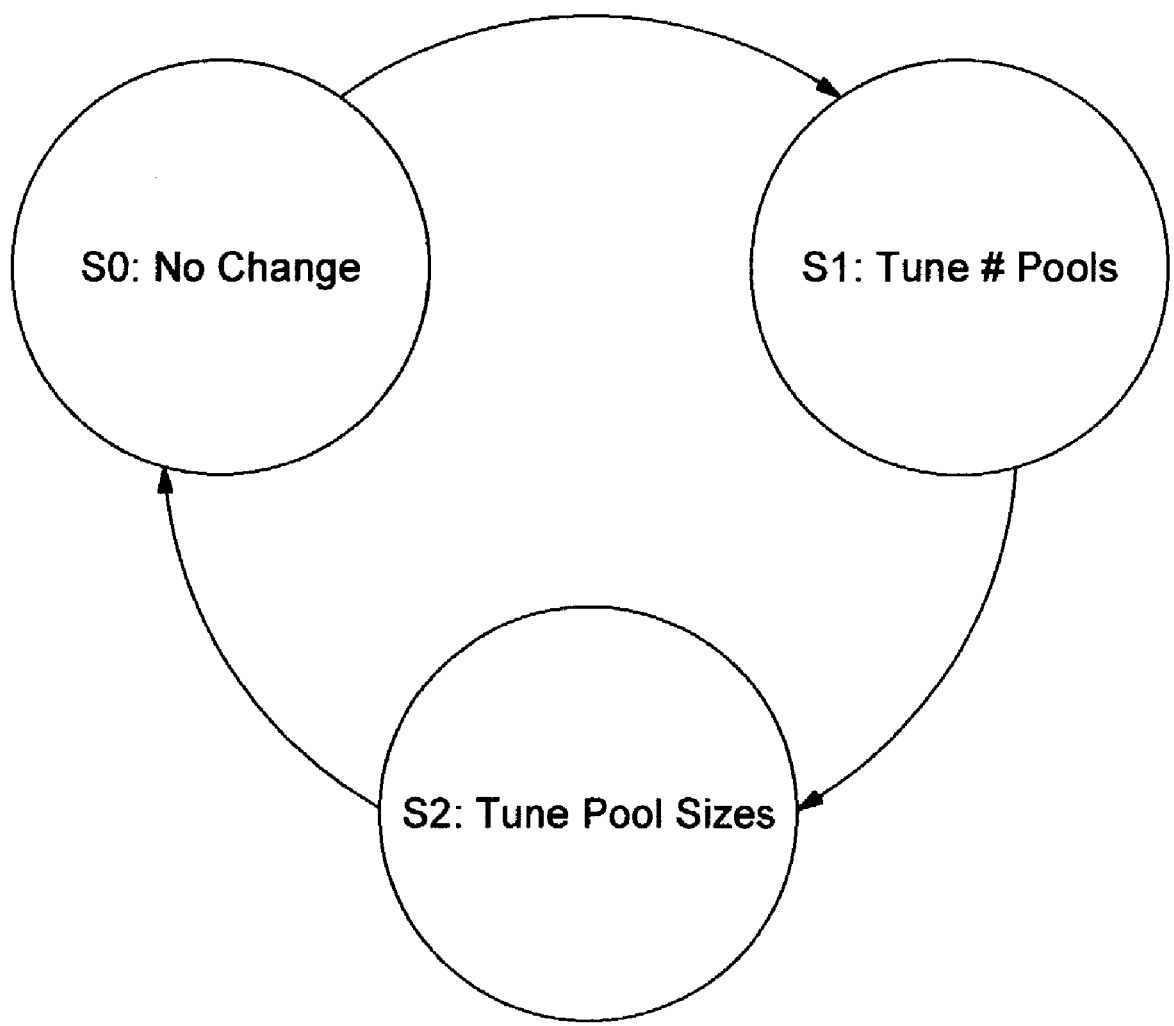
FIG. 5 provides a state diagram illustrating state transitions that may be used with embodiments of the present invention, and these transitions may be used in combination with the logic depicted in FIGS. 6–8 to isolate changes when tuning the number of pools and the size of each pool, according to preferred embodiments.

FIG. 5 provides a state diagram illustrating state transitions that may be used with embodiments of the pool tuning processes disclosed herein. These transitions, in combination with the logic depicted in FIGS. 6–8, may be used to isolate changes when tuning the number of pools and the size of each pool.

As shown in FIG. 5, in an initial state "S0", no change is being made to the number of pools or pool sizes. Then, the number of pools is tuned in the next state, "S1". Finally, the pool sizes may be individually tuned at state "S2". Preferably, a transition from one state to another is timer-driven, such that the system remains in a particular state for some period of time, enabling the state's impacts on execution to be recorded and analyzed. In preferred embodiments, the timers are built into the tuning process, as illustrated by the logic in FIG. 6 (where Block 620 implements a "sleep" operation before allowing the next state transition). Alternative embodiments may be designed such that transitions are triggered in other ways, such as using an event-driven approach. (In this alternative approach, for example, a transition from state S2 to state S0 might be triggered when FIG. 8 completes the pool size tuning for all pools.)

In alternative embodiments, the ordering of states S1 and S2 may be reversed. In still other embodiments, techniques for invoking the number-of-pool tuning process and the size-of-pool tuning process need not be driven by a state transitions diagram.

Figure 6:
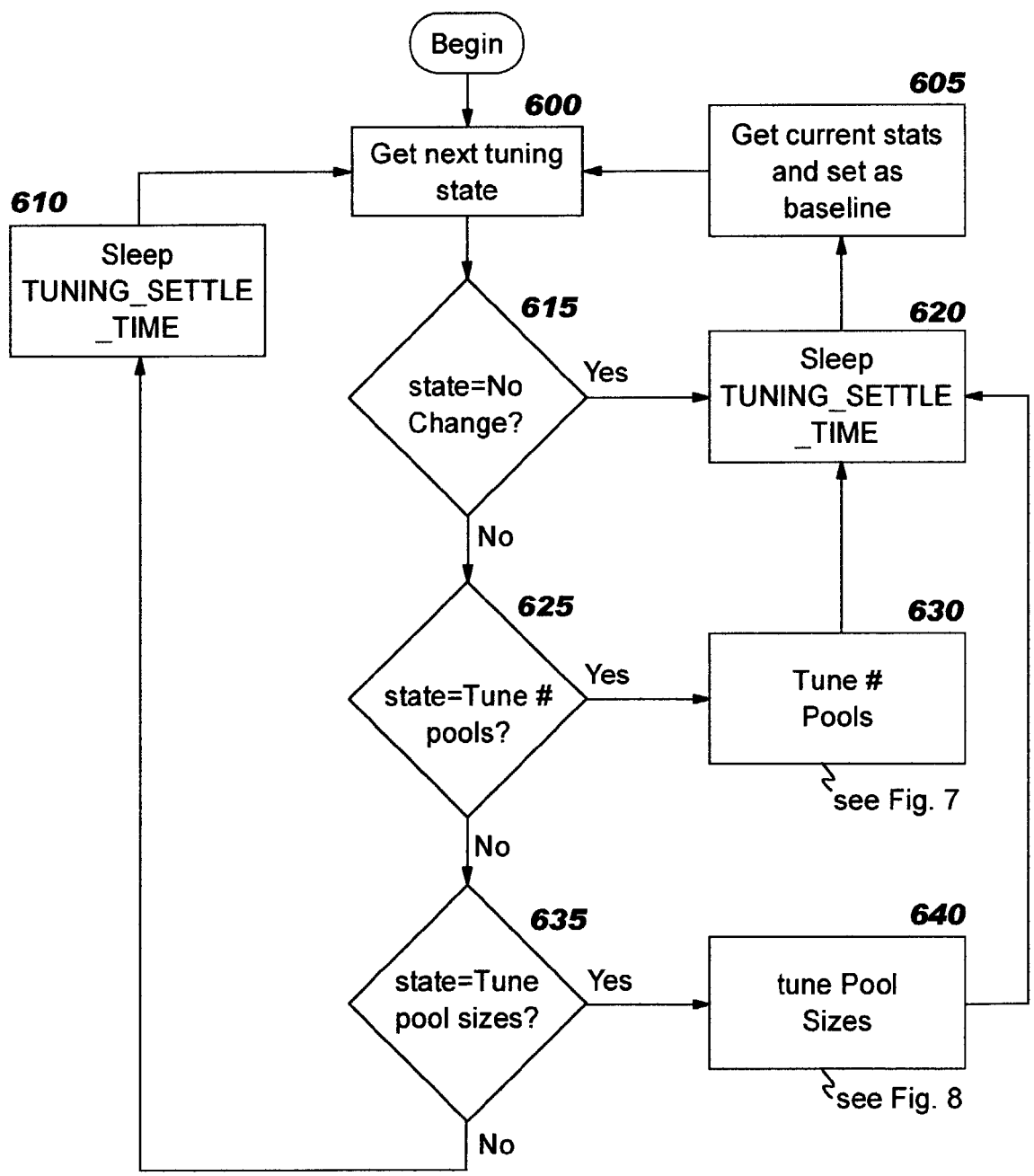
Figure 7:
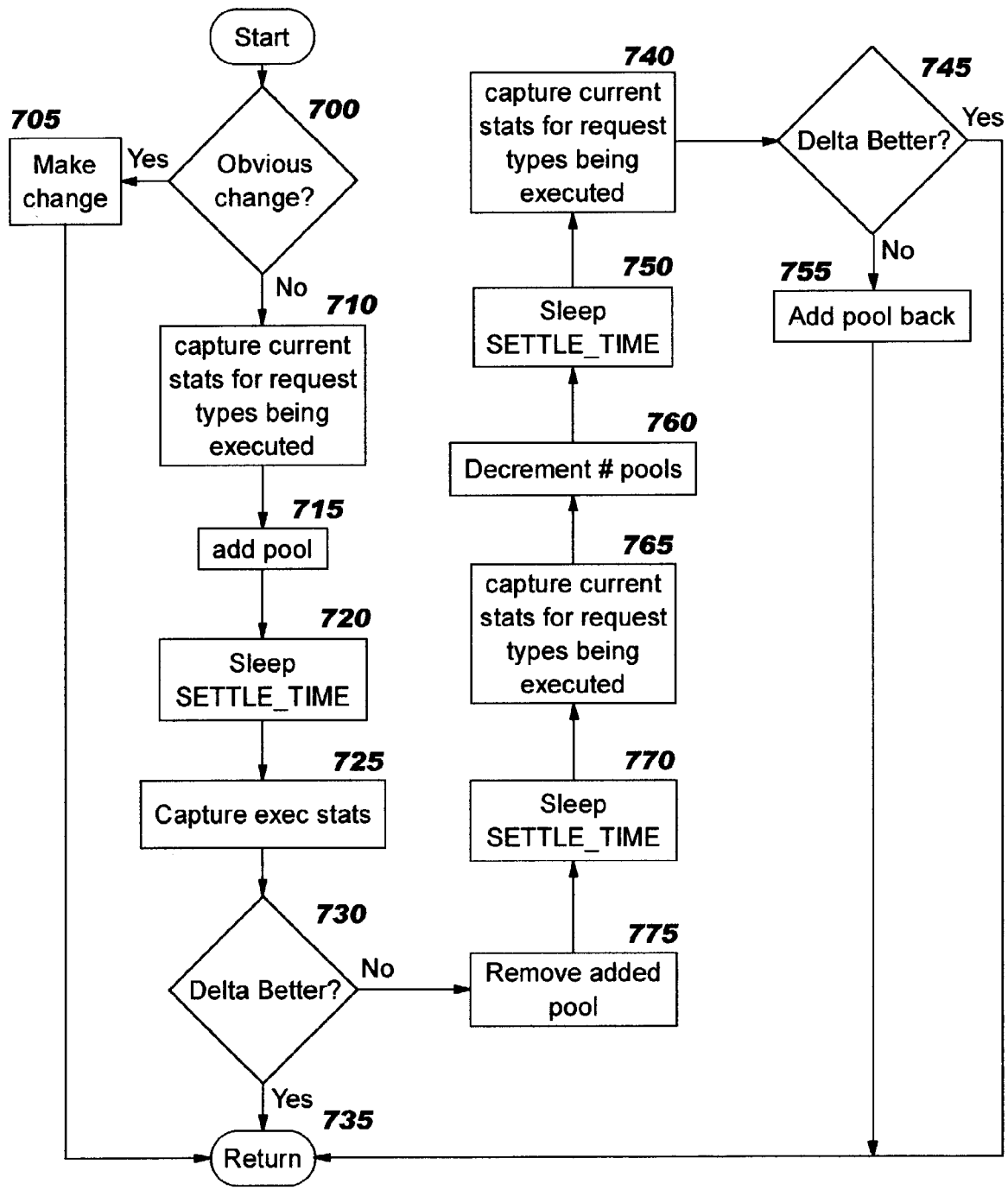
Figure 8:
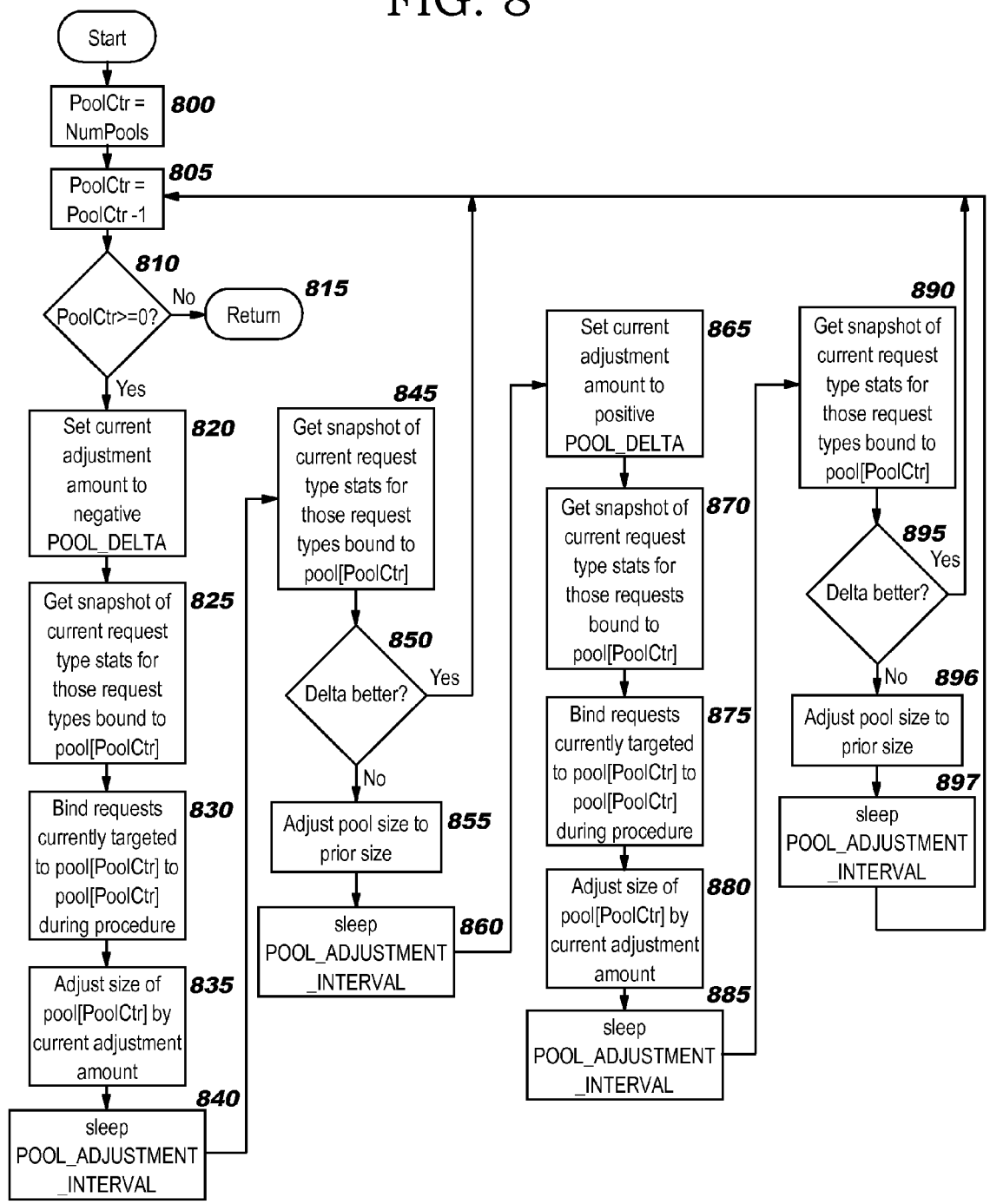

FIGS. 6–8 provide flowcharts of logic that may be used to dynamically tune pool sizes and/or the number of pools to a given workload. FIG. 6 begins (Block 600) by obtaining the next tuning state (with reference to the state diagram shown in FIG. 5). If the next state is "no change" (Block 615), then control transfers to Block 620; otherwise, processing continues at Block 625.

When processing reaches Block 620, a sleep or delay is carried out, preferably for a configured interval referred to in the figure as "TUNING_SETTLE_TIME"—i.e., an amount of time sufficient to allow the system to settle into a steady state. Block 605 then obtains the current statistics and uses them to set a baseline, after which the next tuning operation is carried out by returning to Block 600.

If control transfers to Block 625, a test is made to see if the next tuning state is to tune the number of pools. If so, then at Block 630, a number-of-pools tuning process is carried out, as depicted in more detail in FIG. 7. Upon completing that process, control then transfers to Block 620.

If the test in Block 625 has a negative result, then Block 635 checks to see if the next tuning state is to tune the size of the pools. If so, then at Block 640, a size-of-pools tuning process is carried out, as depicted in more detail in FIG. 8. Upon completing that process, control then transfers to Block 620.

If the test in Block 635 has a negative result, then this is an error. This error may be handled by allowing the tuning process of FIG. 6 to sleep for the TUNING_SETTLE_TIME interval, as shown in Block 610, and then returning control to Block 600. Alternatively, the tuning process may be halted (and an error message is preferably displayed to a systems administrator in this case).

The logic in FIG. 6 then repeats, such that the pool tuning process is performed iteratively.

The logic in FIG. 7 is invoked from Block 630 of FIG. 6 when the number of pools is being tuned. Block 700 checks to see if an obvious change is needed. For example, suppose that there are more pools than there are distinct entries in the classification data. The upper bounds for the various tiles may be duplicated in this case, or there may simply be more pools than there are mapping request types. While this should not happen in a well-tuned and properly performing system, an error of this type might occur. In the general sense, Block 700 may be considered a "catch all" for obvious problems of this type. Thus, if this test has a positive value, then control transfers directly to Block 705 instead of performing any number-of-pools tuning computations, and the change is made. Control then returns to the invoking logic of FIG. 6 (where the system will have time to settle to a steady state following this change).

If there is no obvious change required, then at Block 710, the current statistics are captured for the request types that are being executed by the system's current workload. Preferably, this comprises taking a current snapshot of the classification data, where the execution time and wait time information (and, optionally, standard deviation information) has been updated. An additional pool is added (Block 715).

Block 720 then implements a sleep or wait process for a time interval referred to as "SETTLE_TIME", allowing the classification data to be updated to reflect information about how this change in the number of pools has impacted the execution times and wait times (and, optionally, the standard deviations) for inbound requests. This SETTLE_TIME value is preferably configurable, and may be identical to or different from the TUNING_SETTLE_TIME value used in FIG. 6. Preferably, the SETTLE_TIME value is longer than the time interval for which the distribution calculation of FIG. 4 process sleeps, such that the distribution calculation will automatically be triggered during the SETTLE_TIME sleep, thereby increasing the number of pools over which the execution times are distributed to reflect the pool added at Block 715. Alternatively, the distribution calculation may be explicitly invoked prior to the sleep in Block 720. When the distribution calculation operates, the upper bound values for the pools will be revised. So, for example, if the system was previously using 4 pools, but is now going to use 5 pools, then the distribution calculation will divide the execution times into 5 groups instead of 4.

Upon completion of the wait, Block 725 captures a snapshot of the classification data, and Block 730 tests to see if the statistics in the snapshot from Block 725 are better than those from Block 710—that is, whether the change was for the better. If so, then this added pool will be kept, and control returns (Block 735) to the invoking logic. Otherwise, when the added pool did not improve execution time and wait time of the inbound requests, then the pool is removed (Block 775). In addition, the distribution of execution times is preferably calculated anew, such that the upper bound for each pool is based on this lower number of pools. (As discussed above with reference to Blocks 715 and 720, the distribution calculation may alternatively be explicitly invoked, prior to performing the sleep operation, or if the sleep interval is longer than the distribution calculation interval, then the new distribution calculation will occur automatically during the sleep. As a further alternative, the upper bounds may be saved prior to altering the number of pools at Block 715, and when Block 775 is reached, these saved values may simply be restored.)

The processing beginning at Block 770 is designed to see if reducing (rather than increasing) the number of pools would improve execution time and wait time. Block 770 implements a sleep, for the SETTLE_TIME interval, allowing the system to return to a steady state following the removal of the added pool. Block 765 then captures a snapshot of statistics for the currently-executing requests. Block 760 then decrements the number of pools, and the upper bounds on per-pool execution times are preferably recomputed to reflect the reduced number of pools. Another sleep is then performed at Block 750. (As discussed with reference to Block 775, the upper bounds may be recomputed either during the sleep at Block 750, via appropriate choice of sleep intervals, or by explicit invocation prior to the sleep.) When this sleep interval expires, Block 740 captures a new snapshot, and Block 745 compares this snapshot to the one taken at Block 765. If the new statistics are better, then the system continues with the reduced number of pools by returning (Block 735) to the invoking logic. Otherwise, when execution time and wait time of the inbound requests were not better after removing the pool, then the pool is added back (Block 755) and the distribution of execution times to thread pools is restored (or re-computed) to use the higher number of pools before returning to the invoking logic.

The logic in FIG. 8 is invoked when the pool size tuning is being performed. Block 800 sets a variable "PoolCtr" (i.e., a pool counter index) to the currently-active number of logical thread pools, referred to in the figure as "NumPools". Initially, to use zero-based indexing, Block 805 decrements this pool counter index, and Block 810 then checks to see if the index is greater than or equal to zero. If not, then pool size tuning operations have been attempted for all of the pools, and control returns (Block 815) to the invoking logic of FIG. 6.

In alternative embodiments, it is not necessary to attempt tuning the size of each pool. For example, an iteration counter might be used to limit the number of iterations through the logic in FIG. 8, irrespective of how many pools are currently in use. In still other alternative embodiments, the pool-size tuning may begin with the lowest-numbered pool, rather than the highest-numbered. It will be obvious to those of ordinary skill in the art how the logic of FIG. 8 may be modified to provide alternative approaches, and such approaches are within the scope of the present invention.

If the pool counter index value indicates that there are still more pools to evaluate, then control reaches Block 820 where a "current adjustment amount" is set to a negative value in order to decrement the number of threads in a pool. Preferably, a configurable value (referred to in the figure as "POOL_DELTA") is used as the adjustment amount. This value may be expressed as a percentage, or as an absolute number (such as simply changing the number of threads by one). Which approach will be most advantageous in a particular implementation may depend on factors such as the relative size of the thread pools, and either approach is within the scope of the present invention.

Note that the approach depicted in FIG. 8 tunes the pool having the longest-executing requests first, and then proceeds backwards toward the pool having the shortest-executing requests. It is believed that the pool having the longest-executing requests will usually benefit most from pool-size tuning.

Block 825 indicates that a snapshot of execution statistics is obtained for those request types currently being processed by threads from this pool (i.e., the pool indexed by the pool counter). Refer to the discussion of Block 710, above, for more details on such snapshots. (Note that at Block 825, a subset of the statistics are obtained in preferred embodiments: only the request types being processed by threads from the current pool are of interest here. Alternatively, statistics for the entire workload may be used.) Block 830 notes that these request types are bound to this pool for the duration of the pool size tuning procedure. Block 835 then adjusts the size of this pool, and in the case of using a percentage for POOL_DELTA, this comprises reducing the number of threads assigned to that pool by the POOL_DELTA percentage value. (Note that when reducing or increasing the number of threads in a pool, it is not necessary to revise the upper bound values used for the per-pool execution times. However, this may occur naturally as the distribution calculation continues to run in the background. New request types and request types that are being discarded by the LRU processing may affect the target times during the pool size tuning interval.)

Block 840 then implements a sleep or wait process for a timer interval referred to as "POOL_ADJUSTMENT_INTERVAL", allowing the system to operate under the newly-changed size of the current pool for a period of time. This POOL_ADJUSTMENT_INTERVAL value is preferably configurable, and may be identical to or different from the SETTLE_TIME value used in FIG. 7. Upon completion of the wait, Block 845 captures a snapshot of the request types being executed by the threads in this pool, as described above with reference to Block 825, and Block 850 tests to see if the statistics from Block 845 are better than those from Block 825—that is, whether the change was for the better. If so, then this decremented pool size will be maintained, and control returns to Block 805 to determine whether there is another pool to be tuned.

Otherwise, when the decremented pool size did not improve execution time and wait time of the inbound requests (i.e., Block 850 has a negative result), then the pool size is restored to its prior size (Block 855). The processing beginning at Block 860 is designed to see if increasing, rather than decreasing, the size of this pool would improve execution time and wait time. Block 860 implements a sleep, for the POOL_ADJUSTMENT_INTERVAL, allowing the system to return to a steady state following the restoring of the pool size.

After the sleep interval expires, Block 865 sets the current adjustment amount to increase the pool size by the POOL_DELTA percentage. Block 870 then captures a snapshot of statistics for the currently-executing requests being processed by threads in this thread pool. As noted in Block 875, the request types are bound to this pool for this procedure, so that the impact of the additional thread(s) on the processing of these requests can be evaluated. Block 880 then adjusts the pool size for this pool by the (positive) adjustment amount, such that the pool now has more threads. (In alternative embodiments, a simple incrementing approach may be used, rather than using percentage increases. In this alternative, the number of threads is preferably increased by one when tuning the thread pool size, although other increments may be used without deviating from the scope of the present invention.)

Another sleep is then performed at Block 885. When this sleep interval expires, Block 890 captures a new snapshot, and Block 895 compares this snapshot to the one taken at Block 870. If the new statistics are better, then the system continues with the increased number of threads and control returns to Block 805, where a test will be made to see if there are more thread pools to be tuned. Otherwise, when execution time and wait time of the inbound requests were not better after increasing the pool size (i.e., a negative result at Block 895), then the pool size is restored (Block 896). Another sleep is then initiated (Block 897), after which control returns to Block 805.

Using techniques of the prior art, it may be determined empirically that constraining a thread pool for some reason would be beneficial for system performance. For example, with reference to requests that require database access, there may be a maximum number of database connections that can be open at one time. If threads are not limited, the pool may become "clogged" with requests attempting to access the database. Restricting the thread pool for this scenario serves its purpose, but an undesirable side effect is that other requests in the system—which may not require any database access at all—are also impacted. The self-tuning, dynamic process disclosed herein smooths out impacts of this type automatically, without intervention by a systems administrator.

As has been demonstrated, the present invention provides advantageous techniques for programmatically distributing workload across a set of execution resources, based on the response time characteristics of that workload (and in particular, the execution time and wait time components of that response time). Overall performance of a multithreaded server is thereby improved, and end users may benefit by reduced response time for many of their requests. This programmatic distribution may be used independently of the pool tuning techniques disclosed herein, and performance improvements may be realized even though the number of pools and/or the size of those pools remains (at least temporarily) fixed. Or, either or both of the pool tuning techniques may be implemented as well, and may be expected to provide further performance improvements. The disclosed techniques may be used advantageously with a variety of incoming workload types. While preferred embodiments have been described with reference to classifying inbound requests using particular types of data, this is for purposes of illustration and not of limitation. In general, a message queue workload may be classified by message type and/or data contained within the message (including, but not limited to, a processing destination of the message—where, for example, the processing destination defines the first level handler for the inbound work and the parameters may drive additional logic which varies, from one queued message to another, the code path and the resources utilized.)

The present invention may be provided as method(s) of doing business. For example, a service may be offered to customers whereby operational characteristics of their client/server network traffic is monitored, and adjustments to execution resources are made programmatically based on observations. The techniques that have been described herein may be used when implementing software for carrying out this service. This service may be provided under various revenue models, such as pay-per-use billing, monthly or other periodic billing, and so forth.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in one or more computer-readable memories, where each such memory can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer-implemented method of programmatically distributing workload across thread pools of a multithreaded server, comprising:

determining a number of available thread pools at the server;

obtaining execution times from historical statistics of a workload on the server;

programmatically distributing the obtained execution times over the number of available thread pools, further comprising:

sorting the obtained execution times;

determining a count of the execution times;

dividing the count of execution times by the number of available thread pools to find a value, "N"; and assigning an upper bound on execution time for each of the available thread pools, according to the sorted execution times when accessed using integer multiples of the value "N" as an index; and using the assigned upper bounds for assigning inbound requests to the available thread pools at run time.

2. The method according to claim 1, wherein using the assigned upper bounds further comprises:

receiving at the server, at run time, the inbound requests;

determining, for each of the received requests, an expected execution time for that request; and assigning each of the inbound requests to a first one of the available thread pools for which the assigned upper bound is greater than or equal to the expected execution time of the inbound request, or to a last one of the available thread pools if none of the assigned upper bounds is greater than or equal to the expected execution time.

3. The method according to claim 2, further comprising:

tracking execution time of each of the inbound requests as they execute at the server; and revising the historical statistics of the workload on the server to reflect the tracked execution times.

4. The method according to claim 3, further comprising periodically recomputing the assigned upper bounds to reflect the revised historical statistics by repeating operation of the determining of the number of available threads, the obtaining, and the programmatically distributing.

5. The method according to claim 1, wherein the obtained execution times are moving average execution times.

6. The method according to claim 1, wherein the obtained execution times are maintained per request type.

7. The method according to claim 1, wherein the obtained execution times are maintained per request type and parameter value.

8. The method according to claim 1, wherein the obtained execution times are maintained per method name.

9. The method according to claim 1, wherein the obtained execution times are maintained per method name and parameter values.

10. The method according to claim 1, wherein the obtained execution times are maintained per method name and parameter names and values.

11. The method according to claim 1, wherein the obtained execution times are maintained per Uniform Resource Identifier ("URI") name and parameter values.

12. The method according to claim 1, wherein the obtained execution times are maintained per processing destination.

13. The method according to claim 1, wherein using the assigned upper bounds further comprises, for each of the inbound requests,
receiving the inbound request at the server;
determining a classification key of the received request;
locating an average execution time for the received request, using the determined classification key; and
assigning the received request to a particular one of the available thread pools for executing the received request by iteratively comparing the located average execution time to each of the assigned upper bounds until the compared-to assigned upper bound is greater than or equal to the located average execution time and assigning the received request to the available thread pool having that compared-to assigned upper bound, or assigning the received request to a last one of the available thread pools if none of the compared-to assigned upper bounds is greater than or equal to the located average execution time.

14. The method according to claim 1, wherein the thread pools are logically organized groupings of a physical thread pool.

15. A system for programmatically distributing inbound requests across thread pools in a multithreaded server, comprising:
means for determining a number of available thread pools at the server;
means for obtaining execution times from historical statistics of a workload on the server;
means for programmatically distributing the obtained execution times over the number of available thread pools, further comprising:
means for sorting the obtained execution times;
means for determining a count of the execution times;
means for dividing the count of execution times by the number of available thread pools to find a value, "N"; and
means for assigning an upper bound on execution time for each of the available thread pools, according to the sorted execution times when accessed using integer multiples of the value "N" as an index;
means for receiving at the server, at run time, inbound requests; and
means for assigning the received requests to the available thread pools according to the assigned upper bounds.

16. The system according to claim 15, further comprising:
means for tracking execution time of each of the inbound requests as they execute at the server; and
means for revising the historical statistics of the workload on the server to reflect the tracked execution times.

17. The system according to claim 16, further comprising means for periodically recomputing the assigned upper bounds to reflect the revised historical statistics by repeating operation of the means for determining the number of available threads the means for obtaining, and the means for programmatically distributing.

18. The system according to claim 15, wherein the obtained execution times are moving average execution times.

19. The system according to claim 15, wherein the obtained execution times are maintained per request type.

20. The system according to claim 15, wherein the obtained execution times are maintained per method name.

21. The system according to claim 15, wherein the obtained execution times are maintained per Uniform Resource Identifier ("URI") name.

22. The system according to claim 15, wherein the obtained execution times are maintained per processing destination.

23. The system according to claim 15, wherein the means for assigning further comprises, for each of the received inbound requests:
means for determining a classification key of the received request;
means for locating an average execution time for the received request, using the determined classification key; and
means for assigning the received request to a particular one of the available thread pools for executing the received request by iteratively comparing the located average execution time to each of the assigned upper bounds until the compared-to assigned upper bound is greater than or equal to the located average execution time and assigning the received request to the available thread pool having that compared-to assigned upper bound, or assigning the received request to a last one of the available thread pools if none of the compared-to assigned upper bounds is greater than or equal to the located average execution time.

24. A computer program product for programmatically distributing workload across thread pools of a multithreaded server, the computer program product embodied on one or more computer readable media readable by a computing system in a computing environment and comprising:
computer-readable program code for determining a number of available thread pools at the server;
computer-readable program code for obtaining execution times from historical statistics of a workload on the server;
computer-readable program code for programmatically distributing the obtained execution times over the number of available thread pools, further comprising:
computer-readable program code for sorting the obtained execution times;
computer-readable program code for determining a count of the execution times;

computer-readable program code for dividing the count of execution times by the number of available thread pools to find a value, "N"; and computer-readable program code for assigning an upper bound on execution time for each of the available thread pools, according to the sorted execution times when accessed using integer multiples of the value "N" as an index; and computer-readable program code for using the assigned upper bounds for assigning inbound requests to the available thread pools at run time.

25. The computer program product according to claim 24, wherein the computer-readable program code for using further comprises:

computer-readable program code for receiving at the server, at run time, the inbound requests;

computer-readable program code for determining, for each of the received requests, an expected execution time for that request; and computer-readable program code for assigning each of the inbound requests to a first one of the available thread pools for which the assigned upper bound is greater than or equal to the expected execution time of the inbound request, or to a last one of the available thread pools if none of the assigned upper bounds is greater than or equal to the expected execution time.

26. The computer program product according to claim 25, further comprising:

computer-readable program code for tracking execution time of each of the inbound requests as they execute at the server; and computer-readable program code for revising the historical statistics of the workload on the server to reflect the tracked execution times.

27. The computer program product according to claim 26, further comprising the step of periodically recomputing the assigned upper bounds to reflect the revised historical statistics by repeating operation of the computer-readable program code for determining the number of available threads, the computer-readable program code for obtaining, and the computer-readable program code for programmatically distributing.

28. The computer program product according to claim 24, wherein the obtained execution times are maintained per request type, parameter names, and parameter values.

29. The computer program product according to claim 24, wherein the obtained execution times are maintained per method name and parameter values.

30. The computer program product according to claim 24, wherein the obtained execution times are maintained per Uniform Resource Identifier ("URI") name and parameter values.

31. The computer program product according to claim 24, wherein the obtained execution times are maintained per processing destination.

32. The computer program product according to claim 24, wherein the computer-readable program code for using further comprises, for each of the inbound requests:

computer-readable program code for receiving the inbound request at the server;

computer-readable program code for determining a classification key of the received request;

computer-readable program code for locating an average execution time for the received request, using the determined classification key; and computer-readable program code for assigning the received request to particular one of the available thread pools for executing the received request by iteratively comparing the located average execution time to each of the assigned upper bounds until the compared-to assigned upper bound is greater than or equal to the located average execution time and assigning the received request to the available thread pool having that compared-to assigned upper bound, or assigning the received request to a last one of the available thread pools if none of the compared-to assigned upper bounds is greater than or equal to the located average execution time.

33. A method of programmatically distributing workload across thread pools of a multithreaded server, comprising steps of:

programmatically monitoring operational characteristics of a workload at a server;

programmatically distributing the workload across thread pools of the server, further comprising the steps of:

determining a number of available thread pools at the server;

obtaining execution times from historical statistics of the workload;

programmatically distributing the obtained execution times over the number of available thread pools, further comprising:

sorting the obtained execution times;

determining a count of the execution times;

dividing the count of execution times by the number of available thread pools to find a value, "N"; and assigning an upper bound on execution time for each of the available thread pools, according to the sorted execution times when accessed using integer multiples of the value "N" as an index;

receiving at the server, at run time, inbound requests; and assigning each of the inbound requests to a first one of the available thread pools for which the assigned upper bound is greater than or equal to an expected execution time for the request, or to a last one of the available thread pools if none of the assigned upper bounds is greater than or equal to the expected execution time; and charging a fee for carrying out the programmatically monitoring and programmatically distributing steps.

* * * * *